(12) United States Patent
Chang

(10) Patent No.: US 7,894,003 B2
(45) Date of Patent: Feb. 22, 2011

(54) FLAT THIN SCREEN TV/MONITOR AUTOMOTIVE ROOF MOUNT

(76) Inventor: Chung L. Chang, 22384 Lazy Trail Rd., Diamond Bar, CA (US) 91765

( * ) Notice: Subject to any disclaimer, the term of this patent is extended or adjusted under 35 U.S.C. 154(b) by 325 days.

(21) Appl. No.: 12/124,082

(22) Filed: May 20, 2008

(65) Prior Publication Data

US 2009/0021036 A1    Jan. 22, 2009

Related U.S. Application Data

(63) Continuation of application No. 10/965,436, filed on Oct. 14, 2004, now Pat. No. 7,379,125, which is a continuation of application No. 10/120,552, filed on Apr. 9, 2002, now abandoned, which is a continuation of application No. 09/717,928, filed on Nov. 21, 2000, now Pat. No. 6,409,242.

(60) Provisional application No. 60/248,981, filed on Nov. 14, 2000.

(51) Int. Cl.
*H04N 5/64* (2006.01)
(52) U.S. Cl. ...................... 348/837; 348/836
(58) Field of Classification Search .......... 348/836, 348/837; 296/37.7, 37.8; 455/62; 725/75–77; *H04N 5/64*
See application file for complete search history.

(56) References Cited

U.S. PATENT DOCUMENTS

| | | | |
|---|---|---|---|
| 3,019,050 A | 1/1962 | Spielman | |
| 3,284,041 A | 11/1966 | Tjaden | |
| 3,737,184 A | 6/1973 | Swartz | |
| 3,773,378 A | 11/1973 | Lewis | |
| 3,944,020 A | 3/1976 | Brown | |
| D246,037 S | 10/1977 | Kelly | |
| D247,234 S | 2/1978 | Stewart | |
| 4,079,987 A | 3/1978 | Bumgardener | |

(Continued)

FOREIGN PATENT DOCUMENTS

CN         2506484        8/2002

(Continued)

OTHER PUBLICATIONS

Compaq Tablet PC TC1000 product summary dated Sep. 3, 2002.

(Continued)

*Primary Examiner*—Sherrie Hsia
(74) *Attorney, Agent, or Firm*—Knobbe, Martens, Olson & Bear, LLP

(57) ABSTRACT

A vehicle roof mounted video display is disclosed. The display is rotatable 180° about a first axis, between a stored position within a housing and a second position in which the display lies flat against the vehicle roof. The display is also rotatable at least 60°, and preferably 90°, about a second axis that intersects and is substantially perpendicular to the first axis. Each axis includes self-tensioning hinges to hold the display in any position. The display self aligns as it reaches either of the first and second positions so that the display is substantially parallel to the roof. When the display is in the storage position, the display screen faces, and is safely enclosed by, the housing. The invention also includes a number of built-in features to provide passengers with a wide range of entertainment options.

3 Claims, 10 Drawing Sheets

U.S. PATENT DOCUMENTS

| | | |
|---|---|---|
| 4,100,372 A | 7/1978 | Hypolite |
| 4,101,159 A | 7/1978 | Stewart |
| 4,241,870 A | 12/1980 | Marcus |
| 4,281,577 A | 8/1981 | Middleton |
| D260,507 S | 9/1981 | Kosugi et al. |
| D264,969 S | 6/1982 | McGourty |
| 4,352,200 A | 9/1982 | Oxman |
| 4,394,055 A | 7/1983 | Smith |
| 4,440,443 A | 4/1984 | Nordskog |
| 4,445,750 A | 5/1984 | Grois et al. |
| D280,312 S | 8/1985 | Simeri et al. |
| D282,251 S | 1/1986 | Isham et al. |
| D282,733 S | 2/1986 | Giavazzi et al. |
| 4,584,603 A | 4/1986 | Harrison |
| D284,280 S | 6/1986 | Mack, Jr. et al. |
| D285,684 S | 9/1986 | Akita et al. |
| 4,630,821 A | 12/1986 | Greenwald |
| 4,635,110 A | 1/1987 | Weinblatt |
| 4,647,980 A | 3/1987 | Steventon et al. |
| 4,669,694 A | 6/1987 | Malick |
| 4,681,366 A | 7/1987 | Lobanoff |
| 4,756,528 A | 7/1988 | Umashankar |
| 4,758,047 A | 7/1988 | Hennington |
| 4,792,183 A | 12/1988 | Townsend, III |
| 4,797,934 A | 1/1989 | Hufnagel |
| 4,818,010 A | 4/1989 | Dillon |
| 4,824,159 A | 4/1989 | Fluharty et al. |
| 4,833,727 A | 5/1989 | Calvet et al. |
| 4,843,477 A | 6/1989 | Mizutani et al. |
| 4,867,498 A | 9/1989 | Delphia et al. |
| 4,870,676 A | 9/1989 | Lewo |
| 4,950,842 A | 8/1990 | Menninga |
| RE33,423 E | 11/1990 | Labanoff |
| 4,982,996 A | 1/1991 | Vottero-Fin et al. |
| 4,983,951 A | 1/1991 | Igarashi et al. |
| 5,040,990 A | 8/1991 | Suman et al. |
| D320,587 S | 10/1991 | Kapp et al. |
| 5,061,996 A | 10/1991 | Schiffman |
| D323,929 S | 2/1992 | Hodson |
| 5,096,271 A | 3/1992 | Portman |
| 5,109,572 A | 5/1992 | Park |
| 5,145,128 A | 9/1992 | Umeda |
| 5,163,870 A | 11/1992 | Cooper |
| 5,177,616 A | 1/1993 | Riday |
| 5,188,421 A | 2/1993 | Arseneault |
| 5,192,301 A | 3/1993 | Kamiya et al. |
| 5,214,514 A | 5/1993 | Haberkern |
| D338,003 S | 8/1993 | Nakayama |
| D340,016 S | 10/1993 | Falcoff |
| 5,255,214 A | 10/1993 | Ma |
| 5,267,337 A | 11/1993 | Kirma |
| 5,267,775 A | 12/1993 | Nguyen |
| 5,303,970 A | 4/1994 | Young et al. |
| 5,311,302 A | 5/1994 | Berry et al. |
| D349,893 S | 8/1994 | Bennett |
| 5,338,081 A | 8/1994 | Young et al. |
| 5,359,349 A | 10/1994 | Jambor et al. |
| 5,396,340 A | 3/1995 | Ishii et al. |
| 5,397,160 A | 3/1995 | Landry |
| 5,410,447 A | 4/1995 | Miyagawa et al. |
| 5,467,106 A | 11/1995 | Salomon |
| 5,469,298 A | 11/1995 | Suman et al. |
| 5,507,556 A | 4/1996 | Dixon |
| 5,522,638 A | 6/1996 | Falcoff et al. |
| 5,529,265 A | 6/1996 | Sakurai |
| D371,357 S | 7/1996 | Nakamura |
| 5,547,248 A | 8/1996 | Marechal |
| 5,555,466 A | 9/1996 | Scribner et al. |
| 5,583,735 A | 12/1996 | Pease et al. |
| 5,636,891 A | 6/1997 | Van Order et al. |
| 5,696,861 A | 12/1997 | Schimmeyer et al. |
| D389,818 S | 1/1998 | Smith |
| 5,705,860 A | 1/1998 | Ninh et al. |
| 5,709,360 A | 1/1998 | Rosen |
| D390,219 S | 2/1998 | Rosen |
| 5,713,633 A | 2/1998 | Lu |
| D394,432 S | 5/1998 | Rosen |
| 5,775,762 A | 7/1998 | Vitito |
| 5,811,791 A | 9/1998 | Portman |
| D399,200 S | 10/1998 | Rosen |
| 5,822,023 A | 10/1998 | Suman et al. |
| 5,823,599 A | 10/1998 | Gray |
| 5,831,811 A | 11/1998 | Van Horn |
| 5,842,715 A | 12/1998 | Jones |
| 5,847,685 A | 12/1998 | Otsuki |
| D410,458 S | 6/1999 | Rosen |
| D410,464 S | 6/1999 | Hakoda |
| 5,910,882 A | 6/1999 | Burrell |
| 5,927,784 A | 7/1999 | Vitito |
| 5,940,120 A | 8/1999 | Frankhouse et al. |
| 5,946,055 A | 8/1999 | Rosen |
| D413,856 S | 9/1999 | Scribner |
| D413,937 S | 9/1999 | Smith |
| 5,949,345 A | 9/1999 | Beckert et al. |
| 5,959,596 A | 9/1999 | McCarten et al. |
| D414,856 S | 10/1999 | Zuege |
| D416,015 S | 11/1999 | Mitchell |
| 5,982,429 A | 11/1999 | Kamamoto et al. |
| 5,984,347 A | 11/1999 | Blanc-Rosset |
| 5,996,954 A | 12/1999 | Rosen et al. |
| 5,997,091 A | 12/1999 | Rech et al. |
| 6,007,036 A | 12/1999 | Rosen |
| 6,045,181 A | 4/2000 | Ikeda et al. |
| 6,055,478 A | 4/2000 | Heron |
| 6,056,248 A | 5/2000 | Ma |
| 6,059,255 A | 5/2000 | Rosen et al. |
| 6,081,420 A | 6/2000 | Kim et al. |
| 6,092,705 A | 7/2000 | Meritt |
| 6,093,039 A | 7/2000 | Lord |
| 6,097,448 A | 8/2000 | Perkins |
| 6,102,476 A | 8/2000 | May et al. |
| 6,115,086 A | 9/2000 | Rosen |
| 6,124,902 A | 9/2000 | Rosen |
| 6,125,030 A | 9/2000 | Mola et al. |
| D432,586 S | 10/2000 | Galli-Zugaro et al. |
| 6,135,801 A | 10/2000 | Helot et al. |
| D434,400 S | 11/2000 | Rosen |
| D434,749 S | 12/2000 | Ito et al. |
| 6,157,418 A | 12/2000 | Rosen |
| 6,179,263 B1 | 1/2001 | Rosen et al. |
| 6,181,387 B1 | 1/2001 | Rosen |
| D437,837 S | 2/2001 | Harrison et al. |
| 6,186,459 B1 | 2/2001 | Ma |
| 6,195,438 B1 | 2/2001 | Yumoto et al. |
| D438,853 S | 3/2001 | Lino |
| 6,199,810 B1 | 3/2001 | Wu et al. |
| 6,216,927 B1 | 4/2001 | Meritt |
| 6,219,927 B1 | 4/2001 | Westermaier |
| 6,231,371 B1 | 5/2001 | Helot |
| 6,246,449 B1 | 6/2001 | Rosen |
| 6,250,967 B1 | 6/2001 | Chu |
| 6,256,837 B1 | 7/2001 | Lan et al. |
| 6,266,236 B1 | 7/2001 | Ku et al. |
| 6,267,428 B1 | 7/2001 | Baldas et al. |
| D446,507 S | 8/2001 | Rosen et al. |
| 6,275,376 B1 | 8/2001 | Moon |
| D448,009 S | 9/2001 | Lavelle et al. |
| 6,292,236 B1 | 9/2001 | Rosen |
| 6,304,173 B2 | 10/2001 | Pala et al. |
| D450,667 S | 11/2001 | Scribner |
| 6,339,455 B1 | 1/2002 | Allan et al. |
| 6,339,696 B1 | 1/2002 | Chan et al. |
| D454,121 S | 3/2002 | Lavelle et al. |
| 6,361,012 B1 | 3/2002 | Chang |

| | | | | | | |
|---|---|---|---|---|---|---|
| 6,363,204 B1 | 3/2002 | Johnson et al. | | 7,315,729 B2 | 1/2008 | Schedevy |
| D456,371 S | 4/2002 | Lavelle et al. | | 7,327,225 B2 | 2/2008 | Nicholas et al. |
| 6,364,390 B1 | 4/2002 | Finneman | | 7,333,009 B2 | 2/2008 | Schedivy |
| 6,380,978 B1 | 4/2002 | Adams | | 7,334,243 B2 | 2/2008 | Chengalva et al. |
| 6,381,133 B1 | 4/2002 | Chen | | D564,974 S | 3/2008 | Berg et al. |
| D456,789 S | 5/2002 | Snyker | | 7,352,355 B2 | 4/2008 | Troxell et al. |
| D457,506 S | 5/2002 | Scribner | | 7,354,091 B2 | 4/2008 | Lavelle et al. |
| 6,394,551 B1 | 5/2002 | Beukema | | 7,360,833 B2 | 4/2008 | Vitito |
| 6,404,622 B1 | 6/2002 | Chen | | 7,379,125 B2 | 5/2008 | Chang |
| 6,409,242 B1 | 6/2002 | Chang | | 7,440,275 B2 | 10/2008 | Schedivy |
| 6,412,848 B1 | 7/2002 | Ceccanese et al. | | 7,448,679 B2 | 11/2008 | Chang |
| D461,850 S | 8/2002 | Hussaini et al. | | 7,460,187 B2 | 12/2008 | Schedivy |
| D462,670 S | 9/2002 | Kasuga et al. | | D592,647 S | 5/2009 | L'Henaff et al. |
| 6,446,925 B1 | 9/2002 | Wada | | D592,648 S | 5/2009 | L'Henaff et al. |
| 6,466,278 B1 | 10/2002 | Harrison et al. | | D592,649 S | 5/2009 | L'Henaff et al. |
| D465,492 S | 11/2002 | Scribner | | 7,548,413 B2 | 6/2009 | Schedivy et al. |
| D466,107 S | 11/2002 | Lum | | 7,591,508 B2 | 9/2009 | Chang |
| D467,234 S | 12/2002 | Scribner | | 7,636,930 B2 | 12/2009 | Chang |
| D467,562 S | 12/2002 | Chang | | 7,653,345 B2 | 1/2010 | Schedivy |
| 6,493,546 B2 | 12/2002 | Patsiokas | | 7,661,759 B2 | 2/2010 | Koontz, II et al. |
| 6,510,049 B2 | 1/2003 | Rosen | | 7,667,669 B2 | 2/2010 | Lavelle et al. |
| D470,828 S | 2/2003 | Solland | | 7,679,578 B2 | 3/2010 | Schedivy |
| 6,522,368 B1 | 2/2003 | Tuccinardi et al. | | 7,758,117 B2 | 7/2010 | Chang |
| 6,532,152 B1 | 3/2003 | White et al. | | 7,762,627 B2 | 7/2010 | Chang |
| 6,532,592 B1 | 3/2003 | Shintani et al. | | 2001/0001083 A1 | 5/2001 | Helot |
| 6,549,416 B2 | 4/2003 | Sterner et al. | | 2001/0001319 A1 | 5/2001 | Beckert et al. |
| 6,557,812 B2 | 5/2003 | Kutzehr et al. | | 2001/0055071 A1 | 12/2001 | Kawai |
| 6,619,605 B2 | 9/2003 | Lambert | | 2002/0005917 A1 | 1/2002 | Rosen |
| 6,668,407 B1 | 12/2003 | Reitzel | | 2002/0085129 A1 | 7/2002 | Kitazawa |
| 6,669,285 B1 | 12/2003 | Park et al. | | 2002/0105507 A1 | 8/2002 | Tranchina et al. |
| D485,812 S | 1/2004 | Park | | 2002/0113451 A1 | 8/2002 | Chang |
| 6,678,892 B1 | 1/2004 | Lavelle et al. | | 2002/0149708 A1 | 10/2002 | Nagata et al. |
| 6,688,407 B2 | 2/2004 | Etter et al. | | 2002/0186531 A1 | 12/2002 | Pokharna et al. |
| 6,695,376 B1 | 2/2004 | Hirano | | 2003/0020840 A1 | 1/2003 | Hays et al. |
| 6,698,832 B2 | 3/2004 | Boudinot | | 2003/0021086 A1 | 1/2003 | Landry et al. |
| 6,719,343 B2 | 4/2004 | Emerling et al. | | 2003/0025367 A1 | 2/2003 | Boudinot |
| 6,724,317 B1 | 4/2004 | Kitano et al. | | 2003/0036357 A1 | 2/2003 | McGowan |
| D489,416 S | 5/2004 | Chao | | 2003/0112585 A1 | 6/2003 | Silvester |
| 6,739,654 B1 | 5/2004 | Shen et al. | | 2003/0128183 A1 | 7/2003 | Chang |
| D492,944 S | 7/2004 | Drakoulis et al. | | 2003/0137584 A1 | 7/2003 | Norvell et al. |
| 6,776,455 B2 | 8/2004 | Longtin et al. | | 2003/0140352 A1 | 7/2003 | Kim |
| D502,152 S | 2/2005 | Peng | | 2003/0184137 A1 | 10/2003 | Jost |
| 6,871,356 B2 | 3/2005 | Chang | | 2003/0198008 A1 | 10/2003 | Leapman et al. |
| 6,883,870 B2 | 4/2005 | Jost | | 2003/0202005 A1 | 10/2003 | Sadahiro |
| 6,899,365 B2 | 5/2005 | Lavelle et al. | | 2003/0222848 A1 | 12/2003 | Solomon et al. |
| D508,900 S | 8/2005 | Kawan et al. | | 2004/0007906 A1 | 1/2004 | Park et al. |
| 6,928,654 B2 | 8/2005 | Tranchina et al. | | 2004/0032543 A1 | 2/2004 | Chang |
| D510,329 S | 10/2005 | Vitito | | 2004/0080213 A1 | 4/2004 | Chang |
| D510,330 S | 10/2005 | Peng | | 2004/0083491 A1 | 4/2004 | Chang |
| D511,332 S | 11/2005 | Vitito | | 2004/0085337 A1 | 5/2004 | Barrows |
| 6,961,239 B2 | 11/2005 | Schedivy | | 2004/0085485 A1 | 5/2004 | Schedivy |
| D512,973 S | 12/2005 | Schedivy | | 2004/0085718 A1 | 5/2004 | Imsand |
| 6,975,806 B1 | 12/2005 | Lavelle et al. | | 2004/0086259 A1 | 5/2004 | Schedivy |
| D515,522 S | 2/2006 | Vitito | | 2004/0125549 A1 | 7/2004 | Iredale |
| 6,994,236 B2 | 2/2006 | Hsu | | 2004/0130616 A1 | 7/2004 | Tseng |
| 7,019,794 B2 | 3/2006 | Norvell et al. | | 2004/0160096 A1 | 8/2004 | Boudinot |
| D521,524 S | 5/2006 | Chang | | 2004/0212745 A1 | 10/2004 | Chang |
| 7,036,879 B2 | 5/2006 | Chang | | 2004/0212957 A1 | 10/2004 | Schedivy |
| 7,040,697 B1 | 5/2006 | Tuccinardi et al. | | 2004/0227372 A1 | 11/2004 | Lavelle et al. |
| 7,040,698 B2 | 5/2006 | Park | | 2004/0227695 A1 | 11/2004 | Schedivy |
| 7,044,546 B2 | 5/2006 | Chang | | 2004/0227696 A1 | 11/2004 | Schedivy |
| 7,050,124 B2 | 5/2006 | Schedivy | | 2004/0227861 A1 | 11/2004 | Schedivy |
| 7,066,544 B2 | 6/2006 | Tseng | | 2004/0228622 A1 | 11/2004 | Schedivy |
| 7,084,932 B1 | 8/2006 | Mathias et al. | | 2005/0005298 A1 | 1/2005 | Tranchina |
| 7,095,608 B2 | 8/2006 | Simmons et al. | | 2005/0020320 A1 | 1/2005 | Lavelle et al. |
| 7,149,078 B2 | 12/2006 | Schedivy | | 2005/0024356 A1 | 2/2005 | Lavelle et al. |
| 7,184,259 B2 | 2/2007 | Marler | | 2005/0046756 A1 | 3/2005 | Chang |
| 7,201,354 B1 | 4/2007 | Lee | | 2005/0052046 A1 | 3/2005 | Lavelle et al. |
| 7,201,356 B2 | 4/2007 | Huang | | 2005/0066369 A1 | 3/2005 | Chang |
| 7,218,360 B2 | 5/2007 | Schedivy | | 2005/0098593 A1 | 5/2005 | Schedivy |
| 7,219,942 B2 | 5/2007 | Schedivy | | 2005/0099042 A1 | 5/2005 | Vitito |
| 7,245,274 B2 | 7/2007 | Schedivy | | 2005/0099495 A1 | 5/2005 | Vitito |
| 7,267,402 B2 | 9/2007 | Chang | | 2005/0099547 A1 | 5/2005 | Vitito |

| | | | |
|---|---|---|---|
| 2005/0099548 A1 | 5/2005 | Vitito | |
| 2005/0102697 A1 | 5/2005 | Vitito | |
| 2005/0110313 A1 | 5/2005 | Vitito et al. | |
| 2005/0110913 A1 | 5/2005 | Vitito | |
| 2005/0122670 A1 | 6/2005 | Oh | |
| 2005/0132407 A1 | 6/2005 | Boyer, Jr. et al. | |
| 2005/0155068 A1 | 7/2005 | Chang | |
| 2005/0166238 A1 | 7/2005 | Vitito | |
| 2005/0174498 A1 | 8/2005 | Wu | |
| 2005/0200697 A1 | 9/2005 | Schedivy | |
| 2005/0223406 A1 | 10/2005 | Vitito | |
| 2005/0232585 A1 | 10/2005 | Lavelle et al. | |
| 2005/0235326 A1 | 10/2005 | Vitito | |
| 2005/0235327 A1 | 10/2005 | Vitito | |
| 2005/0242636 A1 | 11/2005 | Vitito | |
| 2005/0242637 A1 | 11/2005 | Vitito | |
| 2005/0242638 A1 | 11/2005 | Vitito | |
| 2005/0249357 A1 | 11/2005 | Schedivy | |
| 2005/0251833 A1 | 11/2005 | Schedivy | |
| 2006/0023412 A1 | 2/2006 | Schedivy | |
| 2006/0034040 A1 | 2/2006 | Simmons et al. | |
| 2006/0047426 A1 | 3/2006 | Vitito | |
| 2006/0070102 A1 | 3/2006 | Vitito | |
| 2006/0070103 A1 | 3/2006 | Vitito | |
| 2006/0097537 A1 | 5/2006 | Schedivy | |
| 2006/0112144 A1 | 5/2006 | Ireton | |
| 2006/0119151 A1 | 6/2006 | Vitito | |
| 2006/0125295 A1 | 6/2006 | Schedivy | |
| 2006/0128303 A1 | 6/2006 | Schedivy | |
| 2006/0218595 A1 | 9/2006 | Chang | |
| 2006/0227212 A1 | 10/2006 | Schedivy | |
| 2006/0236345 A1 | 10/2006 | Schedivy | |
| 2006/0238529 A1 | 10/2006 | Lavelle et al. | |
| 2007/0001492 A1 | 1/2007 | Chang | |
| 2007/0001493 A1 | 1/2007 | Chang | |
| 2007/0008094 A1 | 1/2007 | Schedivy | |
| 2007/0052618 A1 | 3/2007 | Shalam | |
| 2007/0057541 A1 | 3/2007 | Huang | |
| 2007/0070259 A1 | 3/2007 | Schedivy | |
| 2007/0091015 A1 | 4/2007 | Lavelle et al. | |
| 2007/0096517 A1 | 5/2007 | Chang | |
| 2007/0096518 A1 | 5/2007 | Chang | |
| 2007/0097210 A1 | 5/2007 | Chang | |
| 2007/0101372 A1 | 5/2007 | Chang | |
| 2007/0105444 A1 | 5/2007 | Macholz | |
| 2007/0108788 A1 | 5/2007 | Shalam et al. | |
| 2007/0164609 A1 | 7/2007 | Shalam et al. | |
| 2008/0067842 A1 | 3/2008 | Chang | |
| 2008/0093956 A1 | 4/2008 | Maxson | |
| 2008/0165293 A1 | 7/2008 | Tranchina | |
| 2008/0191505 A1 | 8/2008 | Schedivy | |
| 2008/0246319 A1 | 10/2008 | Chang | |
| 2008/0246320 A1 | 10/2008 | Chang | |
| 2008/0252118 A1 | 10/2008 | Chang | |
| 2009/0013357 A1 | 1/2009 | Cassellia et al. | |
| 2009/0021036 A1 | 1/2009 | Chang | |
| 2009/0235513 A1 | 9/2009 | Chang | |
| 2009/0315368 A1 | 12/2009 | Mitchell | |
| 2010/0017827 A1 | 1/2010 | Shalam et al. | |
| 2010/0067884 A1 | 3/2010 | Schedivy | |
| 2010/0146563 A1 | 6/2010 | Chang | |

FOREIGN PATENT DOCUMENTS

| | | |
|---|---|---|
| DE | 3316818 | 11/1984 |
| DE | 3721377 A1 | 1/1989 |
| DE | 4118711 A1 | 12/1992 |
| DE | 19943696 A1 | 3/2001 |
| EP | 0 784 400 | 7/1997 |
| FR | 2817812 | 12/2000 |
| FR | 2829980 | 9/2001 |
| GB | 2276059 A | 9/1994 |
| JP | 58-128942 A | 8/1983 |
| JP | 61-161151 U | 10/1986 |
| JP | 1-94048 | 4/1989 |
| JP | 2-17777 U | 2/1990 |
| JP | 2-144242 | 6/1990 |
| JP | 2-158437 | 6/1990 |
| JP | 3-10476 A | 1/1991 |
| JP | 3-8513 Y | 3/1991 |
| JP | 3-189620 | 8/1991 |
| JP | 3-45875 Y | 9/1991 |
| JP | 3-122482 U | 12/1991 |
| JP | 4-5142 | 1/1992 |
| JP | 4-201639 | 7/1992 |
| JP | 5-38981 | 2/1993 |
| JP | 5-50883 | 3/1993 |
| JP | 5-97098 | 4/1993 |
| JP | 6-57251 U | 8/1994 |
| JP | 7-8680 B | 2/1995 |
| JP | 9-224202 | 8/1997 |
| JP | 10-75389 U | 3/1998 |
| JP | 2001-047921 | 2/2001 |
| JP | 2001-256768 A | 9/2001 |
| JP | 2001-354074 | 12/2001 |
| JP | 2004-25949 A | 1/2004 |
| JP | 2004-81385 A | 3/2004 |
| JP | 2004-231158 A | 8/2004 |
| JP | 2004-231159 A | 8/2004 |
| JP | 2004-529688 A | 9/2004 |
| JP | 2005-503904 A | 2/2005 |
| JP | 2005-525856 A | 9/2005 |
| JP | 2005-532224 A | 10/2005 |
| SE | 63872 | 6/1924 |
| SE | 63912 | 6/1999 |
| SE | 63913 | 6/1999 |
| WO | WO 00/38951 | 7/2000 |
| WO | WO 02/074577 | 9/2002 |
| WO | WO 03/001885 | 1/2003 |
| WO | WO 03/029050 A1 | 10/2003 |
| WO | WO 2004/005077 | 1/2004 |
| WO | WO 2005/038628 | 4/2005 |

OTHER PUBLICATIONS

Compaq Tablet PC TC1000 Docking Station Reference Guide, dated Nov. 2002.
Compaq Tablet PC TC1000 "Getting Started" guide, dated Nov. 2002.
Decision on Appeal of Reexamination of U.S. Patent No. 6,871,356 dated Jun. 25, 2009 (U.S. Appl. No. 95/000,103).
Panasonic Color Television Operating Instructions CT-27SX32, dated 2002.
U.S. Appl. No. 95/000,103 of U.S. Patent No. 6,871,356, filed Aug. 1, 2005.
U.S. Reexamination No. 95/000,007 of U.S. Patent No. 6,339,455, filed Dec. 16, 2002.
Reissue U.S. Appl. No. 10/430,713 of U.S. Appl. No. 09/474,582, filed May 5, 2003.
U.S. Appl. No. 10/985,262, filed Nov. 10, 2004, titled Mobile Video System.
U.S. Appl. No. 11/475,735, filed Jun. 26, 2006, titled Headrest Mounted Entertainment System.
U.S. Appl. No. 11/475,734, filed Jun. 26, 2006, titled Headrest Mounted Entertainment System.
U.S. Appl. No. 11/475,729, filed Jun. 26, 2006, titled Headrest Mounted Entertainment System.
U.S. Appl. No. 11/777,936, filed Jul. 13, 2007, titled Headrest Mounted Monitor.
U.S. Appl. No. 12/103,618, filed Apr. 15, 2008, titled Headrest-Mounted Entertainment Systems.
U.S. Appl. No. 12/103,638, filed Apr. 15, 2008, titled Headrest-Mounted Entertainment Systems.
U.S. Appl. No. 12/103,651, filed Apr. 15, 2008, titled Headrest-Mounted Entertainment Systems.

U.S. Appl. No. 12/475,332, filed May 29, 2009, titled Headrest Mounted Monitor.

Unsolicited letter from Trakker Technologies, Inc., dated Sep. 20, 2005.

"Multimedia halt Einzug im Auto", p. 38-39, *Automotive Electronics 2000*.

Request for Reexamination of U.S. Patent No. 6,871,356, dated Jul. 28, 2005 (U.S. Appl. No. 95/000,103).

Order Granting Request for Reexamination of U.S. Patent No. 6,871,356, dated Sep. 29, 2005 (U.S. Appl. No. 95/000,103).

Action Closing Prosecution for Reexamination of U.S. Patent No. 6,871,356, dated Sep. 29, 2005 (U.S. Appl. No. 95/000,103).

Examiner's Answer during appeal of Reexamination of U.S. Patent No. 6,871,356 dated Nov. 20, 2007 (U.S. Appl. No. 95/000,103).

Office Action for U.S. Appl. No. 10/361,897, now U.S. Patent No. 6,871,356 mailed Aug. 7, 2003.

Office Action for U.S. Appl. No. 10/361,897, now U.S. Patent No. 6,871,356, mailed Feb. 26, 2004.

Office Action for U.S. Appl. No. 10/361,897, now U.S. Patent No. 6,871,356, mailed Aug. 23, 2004.

U.S. Appl. No. 10/985,262, filed Nov. 10, 2004, titled Mobile Video System.

U.S. Appl. No. 11/417,991, filed May 3, 2006, titled Mobile Video System.

Reexamination U.S. Appl. No. 95/000,103 of U.S. Patent No. 6,871,356, filed Aug. 1, 2005.

Reexamination U.S. Appl. No. 95/000,007 of U.S. Patent No. 6,339,455, filed Dec. 16, 2002.

U.S. Appl. No. 11/401,471, filed Apr. 10, 2006, titled Headrest-Mounted Monitor.

U.S. Appl. No. 11/475,735, filed Jun. 26, 2006, titled Headrest Mounted Entertainment System.

U.S. Appl. No. 12/103,618, filed Apr. 15, 2008, titled Headrest-Mounted Entertainment Systems.

U.S. Appl. No. 12/103,638, filed Apr. 15, 2008, titled Headrest-Mounted Entertainment Systems.

U.S. Appl. No. 11/475,734, filed Jun. 26, 2006, titled Headrest Mounted Entertainment System.

U.S. Appl. No. 11/475,729, filed Jun. 26, 2006, titled Headrest Mounted Entertainment System.

Reissue U.S. Appl. No. 10/430,713 of U.S. Appl. No. 09/474,582, filed May 5, 2003.

U.S. Appl. No. 12/103,651, filed Apr. 15, 2008, titled Headrest-Mounted Entertainment Systems.

U.S. Appl. No. 11/777,936, filed Jul. 13, 2007, titled Headrest Mounted Monitor.

HR7DDPKG Installation Manual, Audiovox Electronics Corp., dated 2004.

HR9000PKG Installation Manual, Audiovox Electronics Corp., dated 2006.

U.S. Appl. No. 12/252,026, filed Oct. 15, 2008, titled Headrest-Mounted Monitor.

U.S. Appl. No. 12/614,364, filed Nov. 6, 2009, titled Mobile Video System.

U.S. Appl. No. 12/830,223, filed Jul. 2, 2010, titled Headrest-Mounted Entertainment Systems.

U.S. Appl. No. 11/475,734, filed Jun. 26, 2006, titled Headrest Mounted Entertainment System.

U.S. Appl. No. 11/475,729, filed Jun. 26, 2006, titled Headrest Mounted Entertainment System.

Reissue U.S. Appl. No. 10/430,713 of U.S. Appl. No. 09/474,582, filed May 5, 2003.

U.S. Appl. No. 12/103,651, filed Apr. 15, 2008, titled Headrest-Mounted Entertainment Systems.

U.S. Appl. No. 12/475,332, filed May 29, 2009, titled Headrest Mounted Monitor.

FLAT THIN SCREEN TV/MONITOR AUTOMOTIVE ROOF MOUNT

RELATED APPLICATION

This application is a continuation of application Ser. No. 10/965,436, filed Oct. 14, 2004, now U.S. Pat. No. 7,379,125 which is a continuation of application Ser. No. 10/120,552, filed on Apr. 9, 2002, now abandoned which is a continuation of application Ser. No. 09/717,928, filed on Nov. 21, 2000, now U.S. Pat. No. 6,409,242 which claims priority to provisional Application No. 60/248,981, filed on Nov. 14, 2000. The entirety of each of these applications is hereby incorporated by reference herein.

BACKGROUND OF THE INVENTION

1. Field of the Invention

The invention relates to devices for mounting video displays on the inside surface of an automobile roof. More specifically, the device provides a vehicle mounted video display that incorporates a wide range of entertainment options, is convenient to use and poses little risk of harm to passengers.

2. Description of the Related Art & Summary of the Invention

Overhead consoles for vans and other large vehicles are well known. One type of overhead console contains a video display screen and other components to keep passengers entertained on long journeys. These consoles are generally mounted near the center of the transverse axis of the vehicle with the display screen facing the rear. However, current overhead consoles for video display screens include features that make them either unsafe or inconvenient to use, or both.

U.S. Pat. No. 6,125,030 to Mola discloses a vehicle overhead console with flip down navigation unit. The vehicle overhead console assembly includes a console body with a door pivotally attached to the console body. The door is pivotally movable between open and closed positions. A navigation display unit is connected to the door such that the navigation display unit is exposed for viewing by a vehicle occupant when the door is in the open position, and hidden from view when the door is in the closed position. A groove in a substantially U-shaped flexible latch member engages an edge portion of the console body for securing the door in the latched position. The pins on which the door pivots engage a plurality of detents to hold the door in the desired open position.

The principal drawback of the '030 device is the hazard that it poses to passengers. The device swings forward, from a stored position, to a viewing position where the display screen is substantially perpendicular to the roof of the vehicle. Due to the design of the pivots and the obstruction posed by the console body, the screen cannot swing forward any farther than this position. Thus, it poses a significant obstacle for passengers moving within the vehicle. A passenger who is thrown forward during a collision could be seriously injured by striking the screen.

Another drawback of the '030 design is the limited range of viewing positions available for the display screen. The screen may only rotate about one axis, as described. The screen may not be rotated to the left or right to accommodate viewers who are not seated directly in front of the screen. This drawback is especially acute if the display screen is an LED, which can only be seen from a narrow range of angles in front of the screen.

U.S. Pat. No. 5,775,762 to Vitito discloses an overhead console having a flip-down monitor. The console includes an elongated console housing having a leading end and a trailing end, a monitor mounted in the leading end of the console housing, and a compartment for storing a source of video signals.

The '762 design flips downward from a storage position, in which the screen faces the floor of the vehicle, to a viewing position in which the screen faces the back of the vehicle. Like the '030 design, the display may not be rotated farther than this position in which the display is perpendicular to the roof of the vehicle. Thus, the display of the '762 design poses a hazard to passengers moving toward the rear of the vehicle. Neither may the screen be rotated to the left or right, limiting the range of viewing positions for passengers. Furthermore, the display screen, which is typically glass, is always exposed to the interior of the vehicle. Thus, inadvertent contact with the screen is potentially hazardous to passengers even when the display is in a storage position.

The invention provides a vehicle roof mounted video display. The display is rotatable 180° about a first axis, between a stored position within a housing and a second position in which the display lies flat against the vehicle roof. The display is also rotatable at least 60°, and preferably 90°, about a second axis that intersects and is substantially perpendicular to the first axis. Each axis includes self-tensioning hinges to hold the display in any position.

The display self aligns as it reaches either of the first and second positions. Force acting on the edge of the display as it approaches the roof or the housing causes the display to rotate about the second axis until the display is substantially parallel to the roof. The rotational capability of the display, 180° in one direction and between 60° and 90° in another, allows the display to be easily displaced when contacted by a passenger or other object. Thus, the display does not pose a significant hazard to a passenger who inadvertently bumps into it, either casually or during a vehicle collision.

When the display is in the storage position, the display screen desirably faces, and is safely enclosed by, the housing. The display screen is protected from damage in this position, and passengers are protected from broken pieces of the display screen as might result from a vehicle collision.

The invention also includes a number of built-in features to provide passengers with a wide range of entertainment options. The features include: A television antenna and tuner, A/V input jacks, video-game input jacks, audio-out cables, an FM transmitter cable, and wireless headphone transmitters.

DETAILED DESCRIPTION OF THE PREFERRED EMBODIMENTS

Figure 1:
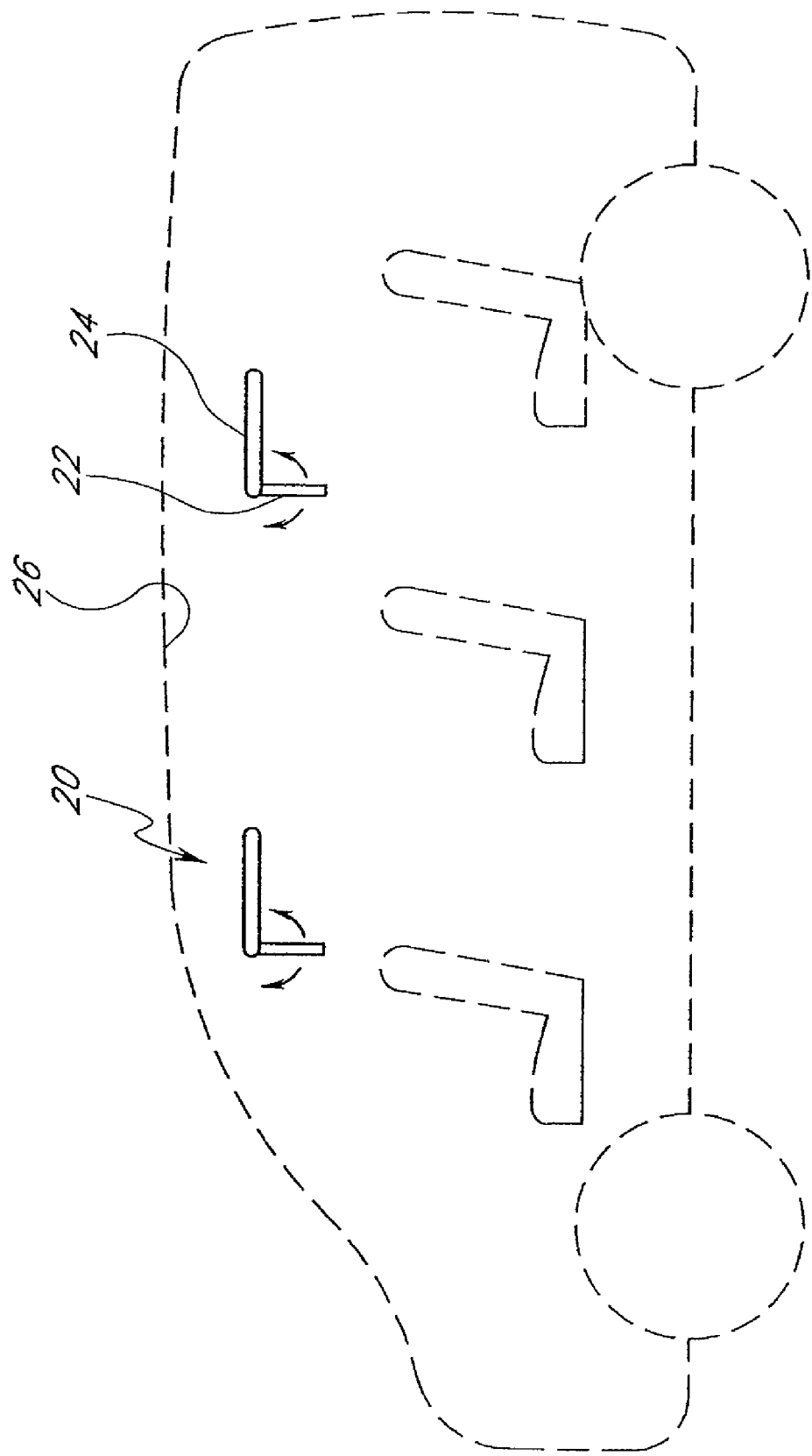
FIG. 1 is a side view of a preferred embodiment of a vehicle roof mount of the present invention disposed within a vehicle.

The invention provides a vehicle roof mount 20 for a video display 22, as illustrated in FIG. 1. It will be understood by one of skill in the art that the invention may be used to mount, among others, television monitors or navigation units that receive airborne signals, as well as closed circuit monitors that receive signals from a source within the vehicle. For the sake of simplicity, the term "display" or "video display" will be used throughout to refer to the visual display component of the invention. No intention to limit the scope of the invention to any particular type of visual display is implied.

Figure 2:
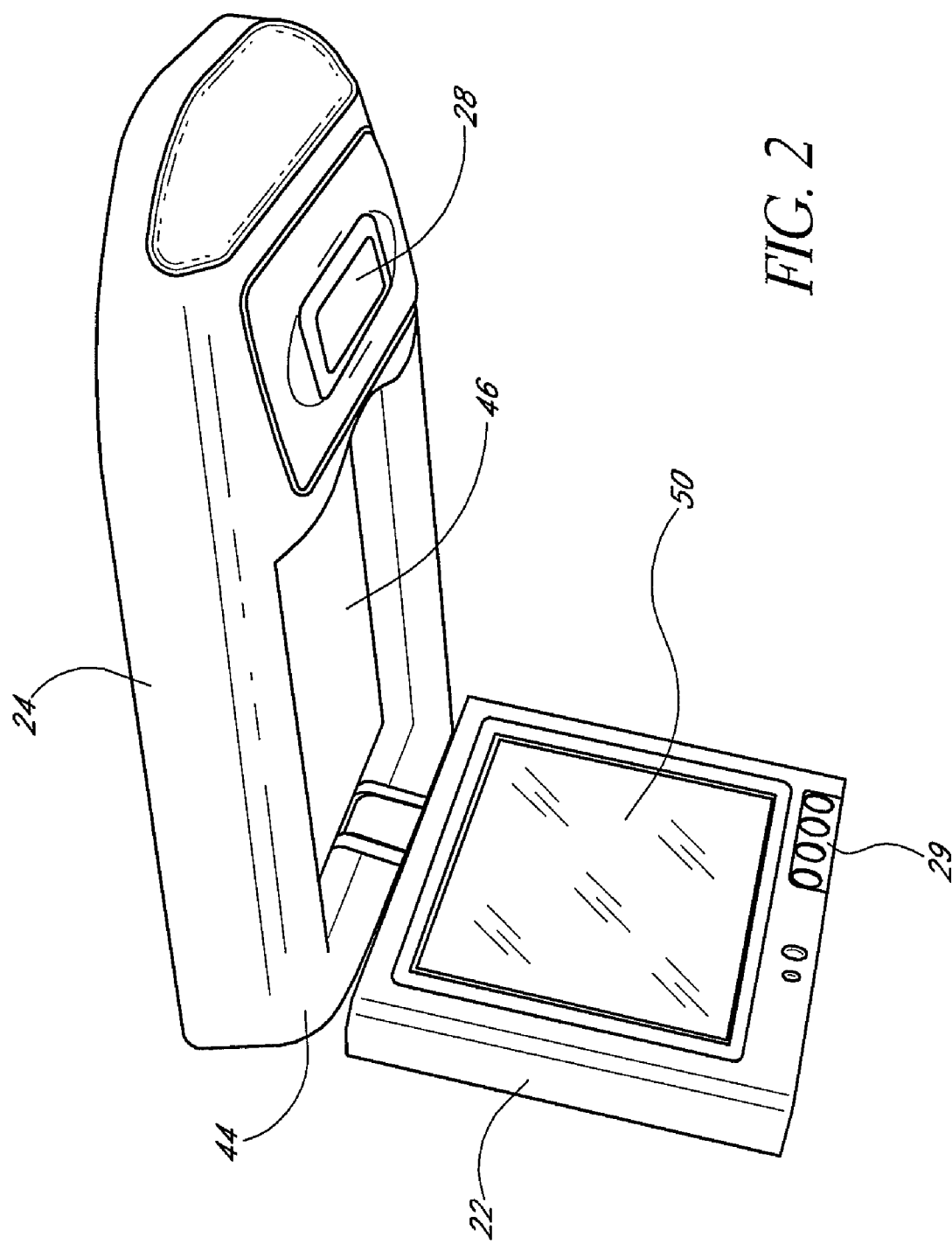
FIG. 2 is a perspective view of a preferred vehicle roof mount of the present invention illustrating the display in a viewing position.

The vehicle roof mount 20 of the present invention comprises a housing 24 adapted to be secured to the interior of a vehicle roof 26, and a video display 22 hingedly attached to the housing 24. FIG. 2 illustrates the display 22 in a viewing position. The housing 24 features an integrated dome light 28 to facilitate manipulation of the various controls of the invention, which are described in detail below. As shown in FIG. 2, some controls 29 are located on a front face of the video display.

Figure 3:
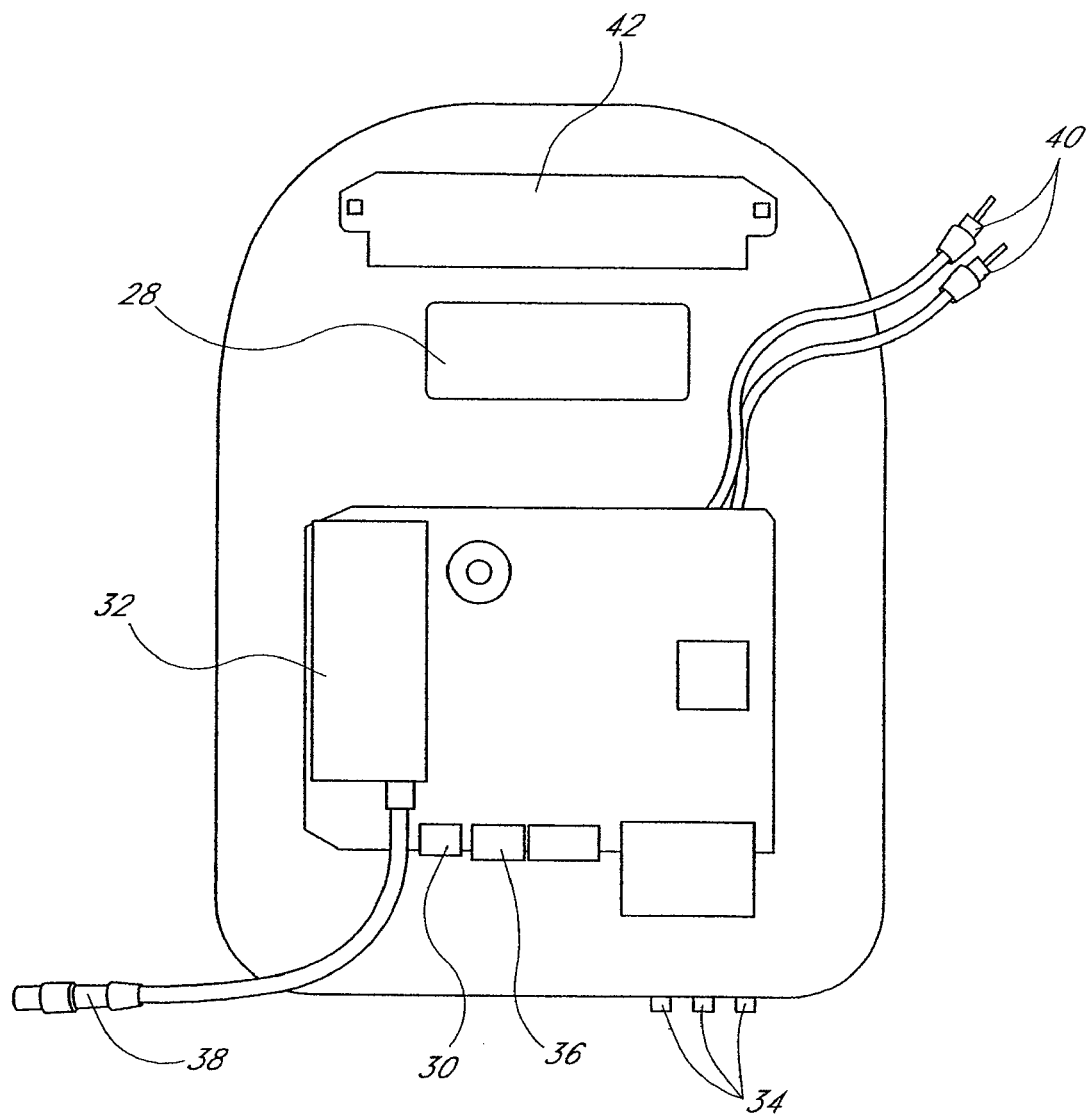
FIG. 3 is a top view of the vehicle roof mount illustrating the internal components.
Figure 4:
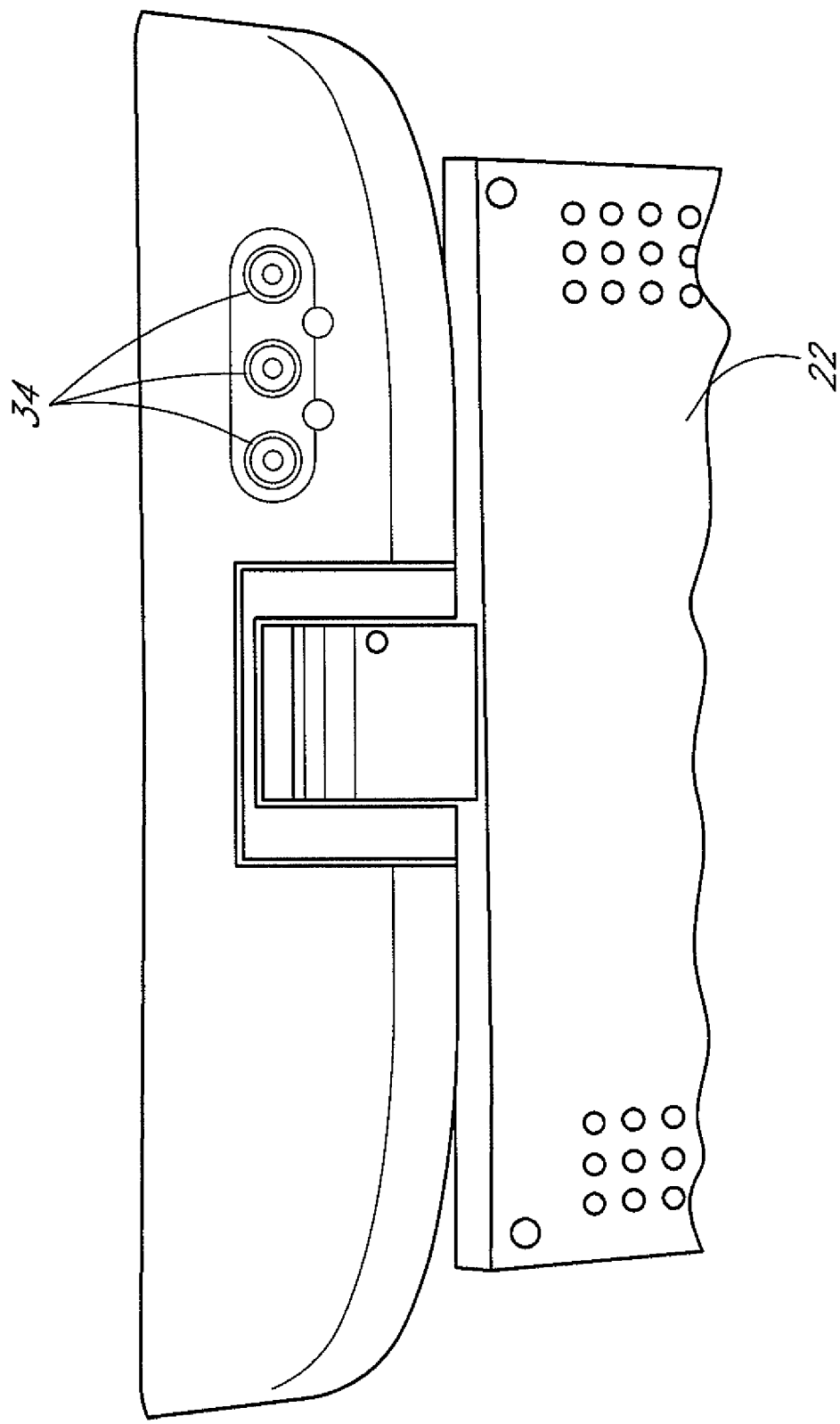
FIG. 4 is a front view of the vehicle roof mount illustrating the A/V input jacks.

The invention has a wide range of capabilities to ensure that passengers are entertained on even the longest of journeys. The internal components that enable each of these capabilities are illustrated in FIG. 3, which is a view of the inside of the housing 24 from an upper perspective. Through a UHF antenna 30 and television tuner 32, the invention can receive and display broadcast television signals. A/V input jacks 34 allow connection of a VCR, DVD player, or other similar closed circuit video source. The A/V input jacks 34, which protrude from the leading portion of the housing 24, can be seen in FIG. 4. A multi-pin input jack 36 allows a video game unit to transmit audio and video signals to the invention. If better sound quality is desired, the speakers connected to the vehicle's stereo system can be used to broadcast the audio from the unit 20 by connecting the unit's FM transmitter 38 to the stereo system. Alternatively, or in addition, audio output cables 40 allow auxiliary speakers to be connected to the unit 20. In order to reduce the level of disturbance to the driver, wireless headphone transmitters 42 are provided to broadcast the audio to headphones worn by the passengers.

Advantageously, the unit 20 is entirely self-contained and is rather easily installed. Thus it is well adapted to be installed in existing vehicles as a retrofit.

The housing 24 is preferably mounted on the vehicle roof 26 in an orientation such that the portion 44 of the housing 24 to which the display 22 is attached faces the vehicle's forward direction of travel. In this orientation, the display 22 is movable from a storage position, in which it resides inside a recess 46 in the housing 24, to a viewing position, in which the display 22 screen faces the rear of the vehicle.

Figure 5:
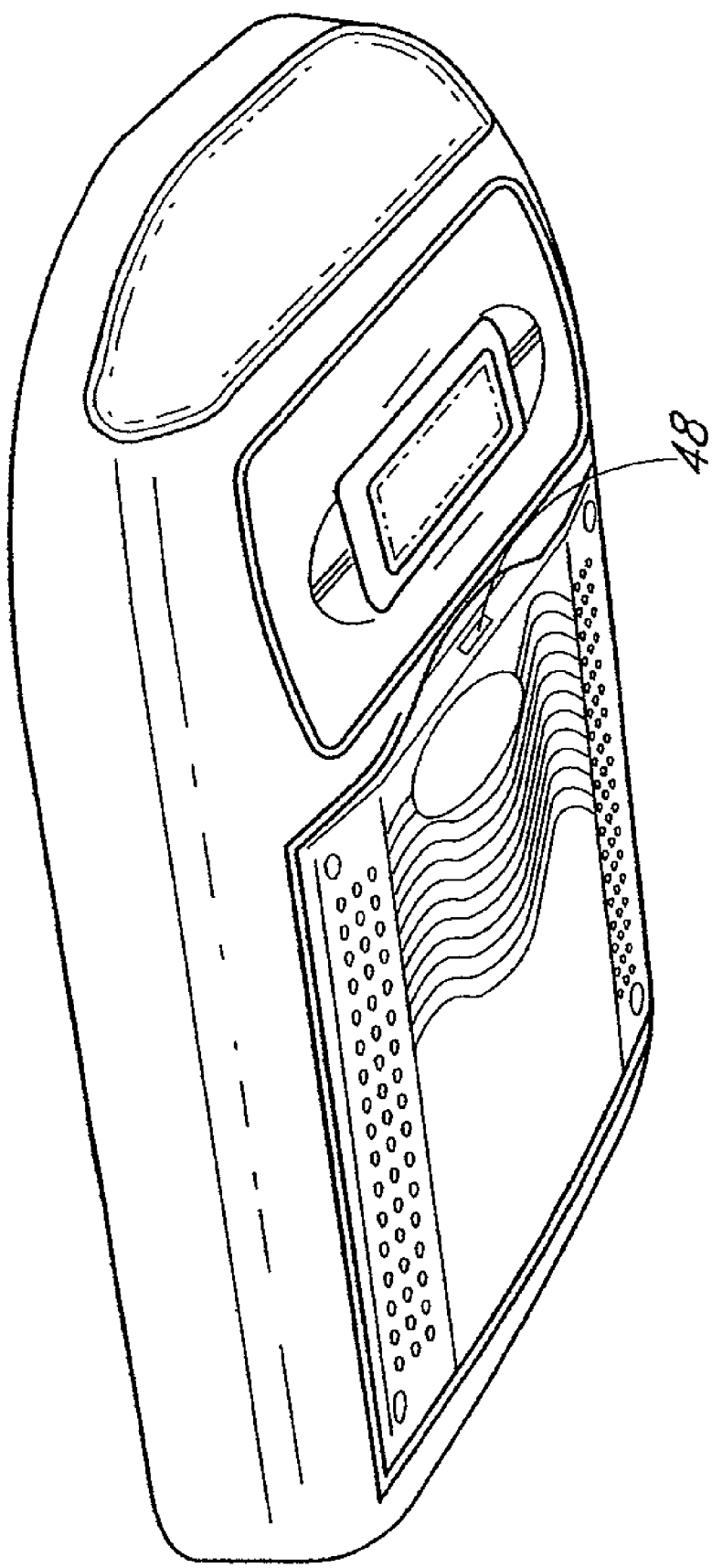
FIG. 5 is a perspective view of the vehicle roof mount illustrating the display in its storage position.

In the storage position, seen in FIG. 5, the display 22 screen faces the housing 24, out of sight of the passengers. The display 22 is held in the storage position by a slidable tab 48, which engages a notch (not shown) on the housing 24. To conserve power when the unit 20 is not in use, a micro-switch (not shown) automatically shuts off the unit 20 when the display 22 is placed in the storage position. With the display screen 50, which is typically made of glass, stowed safely inside the plastic casing of the housing 24, not only is damage to the screen 50 itself minimized, but the risk of injury to passengers from broken glass is largely eliminated.

Furthermore, with the display 22 disposed within the recess 46 of the housing 24, the unit 20 acquires a streamlined profile. Advantageously, the height of the unit 20 in this position is less than three inches. Thus it does not act as an obstruction to passengers who are moving about within the vehicle. This characteristic of the unit 20 is of course advantageous from the standpoint of crash safety, but the advantage of the low profile isn't limited to crashes and other emergency situations. This unit 20 is typically installed in vans and other large vehicles where passengers tend to climb over seats and generally move around more freely than they would in smaller vehicles. The unit's streamlined profile provides greater safety to these passengers as well by reducing the risk of inadvertent bumps against the unit 20.

Figure 6:
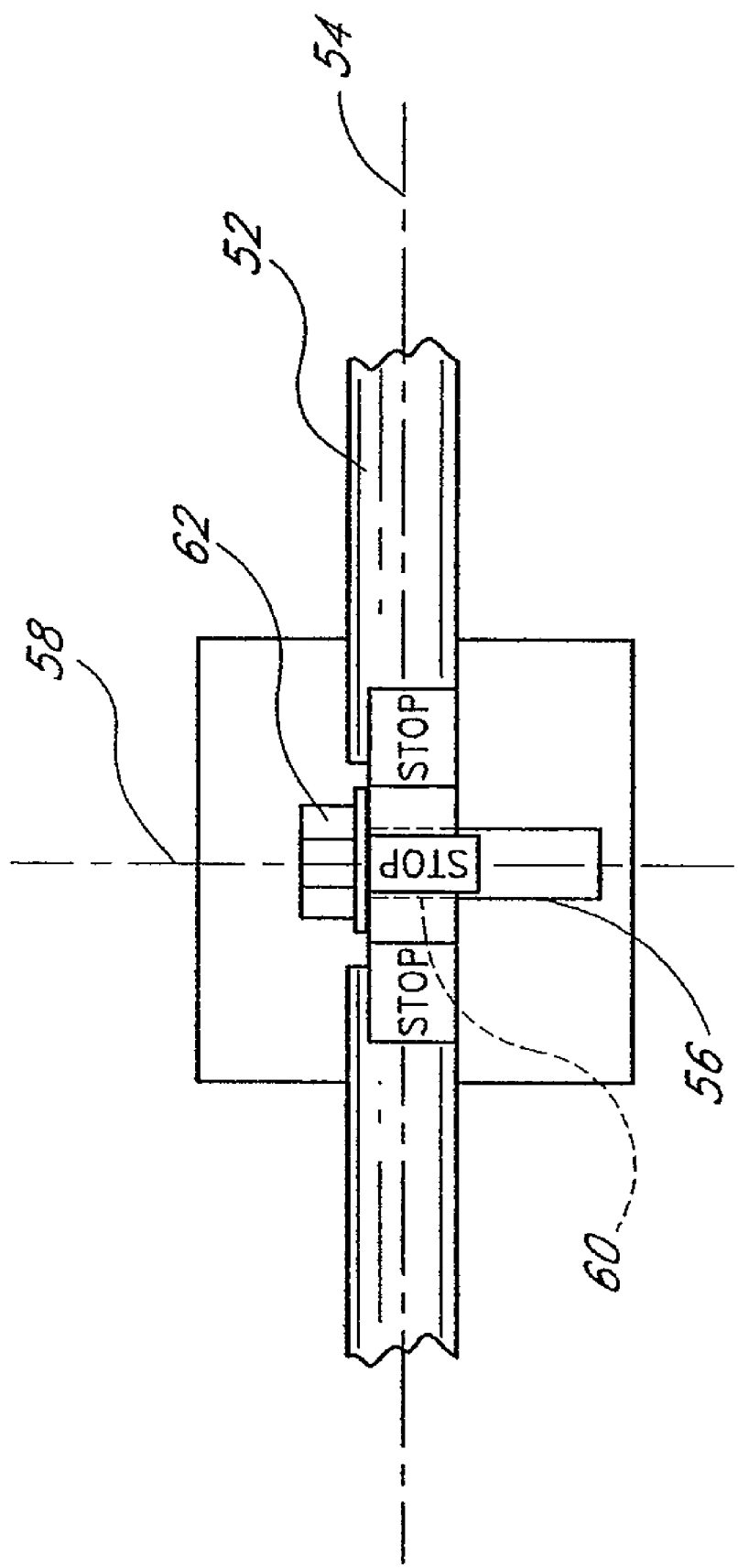
FIG. 6 is a front view of the intersecting hinges of the vehicle roof mount.
Figure 6A:
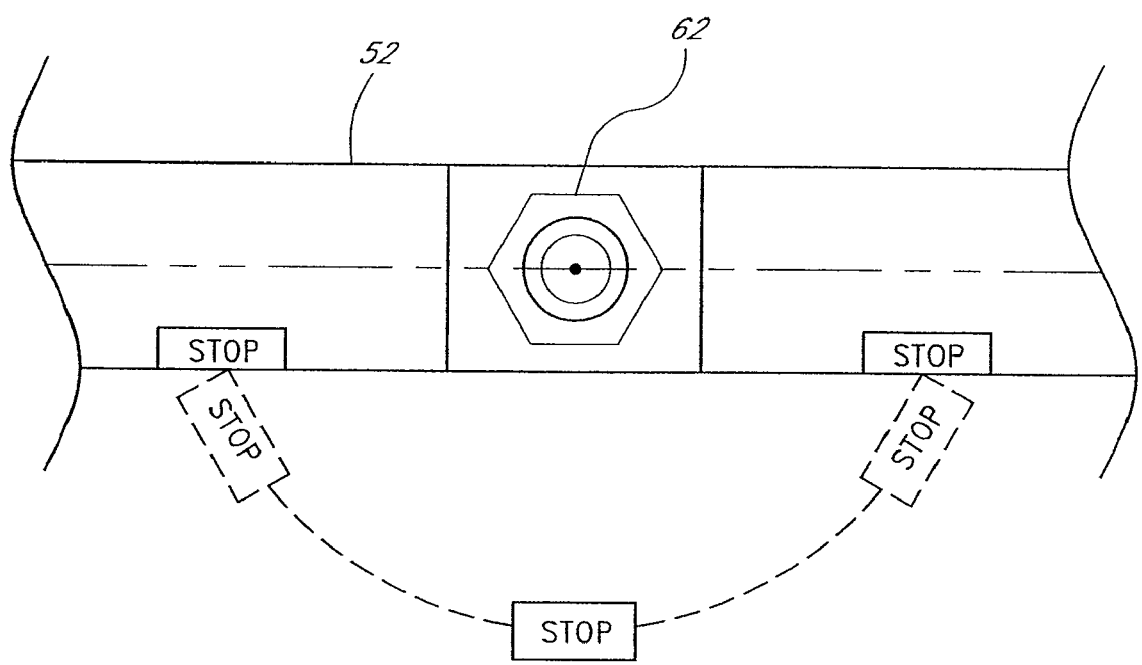
FIG. 6A is a top view of the vehicle roof mount hinge, illustrating the positive stops.
Figure 7:
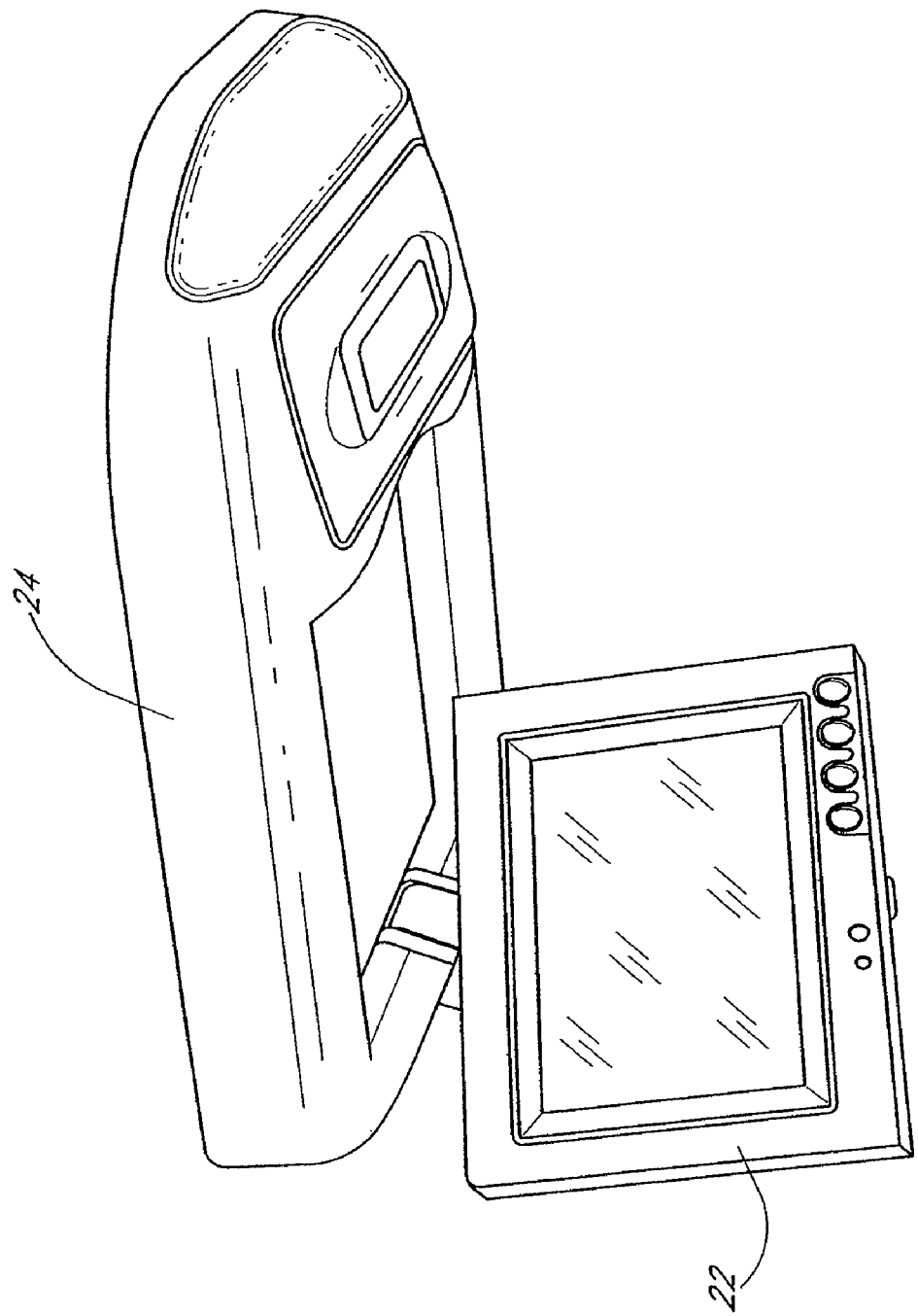
FIG. 7 is a perspective view of the vehicle roof mount illustrating the ability of the display to rotate to the side while in a viewing position.
Figure 8:
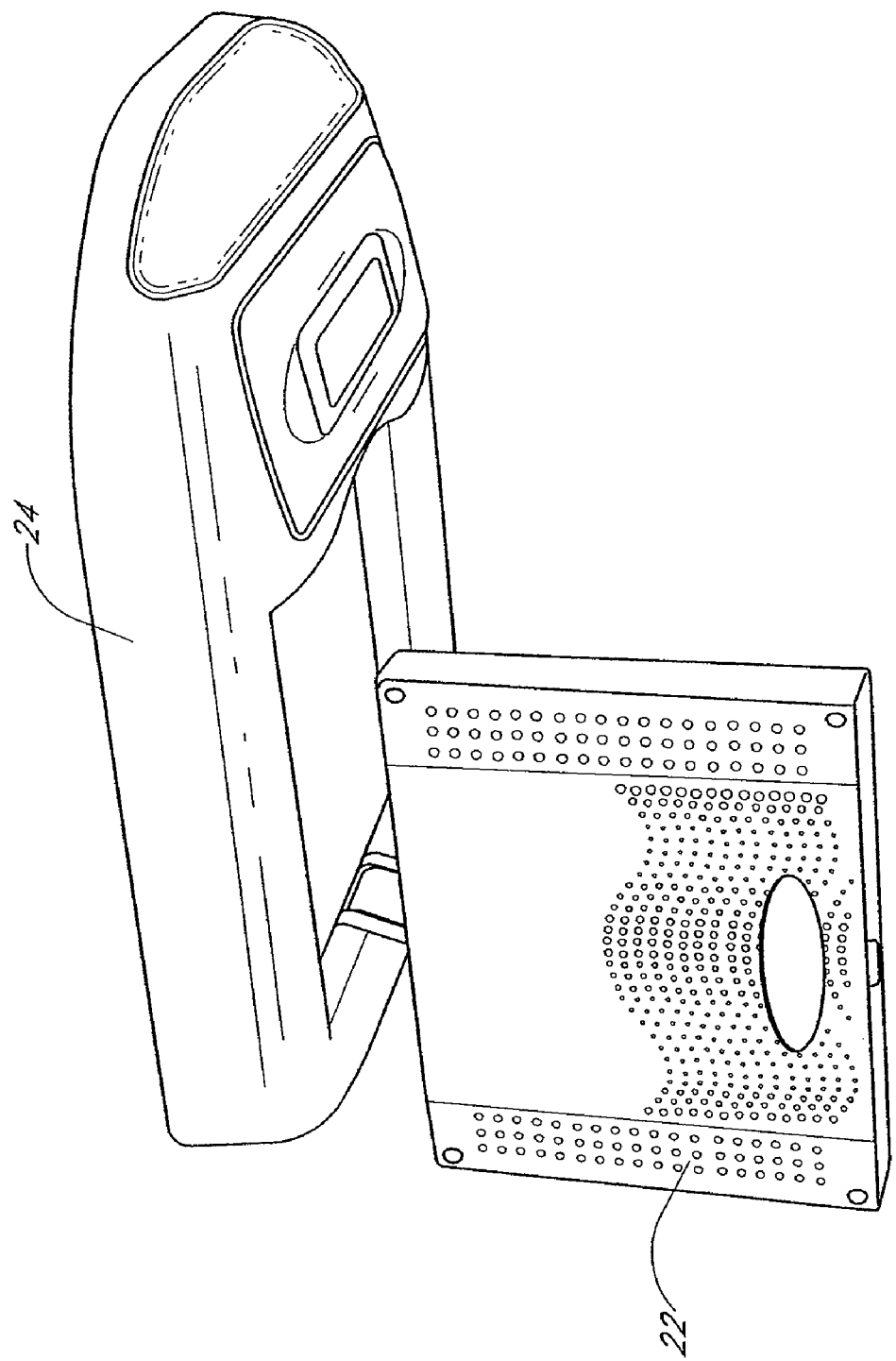
FIG. 8 is a perspective view of the vehicle roof mount illustrating the ability of the display to rotate to the side while in a viewing position.

As alluded to, the display 22 is connected to the housing 24 by hinges, which are illustrated in detail in FIGS. 6 and 6A. More specifically, two hinges are provided so that the display 22 is rotatable about perpendicular axes. The first hinge 52 is disposed within the leading portion 44 of the housing 24 and defines a first axis 54 that is substantially parallel with the roof 26 and perpendicular to the direction of forward travel of the vehicle. The second hinge 56 intersects the first hinge 52 and the display 22 in a manner that allows the display 22 to rotate about a second axis 58 whose orientation is defined by the position of the display 22, but is always substantially perpendicular to the first axis 54. The side-to-side rotational capability of the display 22 is illustrated in FIGS. 7 and 8.

Both hinges 52, 56 are self-tensioning. The first hinge 52 is essentially a cylindrical axle as shown in FIG. 6. The ends of the first hinge 52 are disposed within the housing 24 and mounted in such a way as to provide uniform resistance to rotation of the hinge 52. The second hinge 56 is also a substantially cylindrical axle that intersects the first hinge 52 through a bore 60 in its center, and is held in place with a threaded nut 62. The second hinge 56 and the bore 60 in the first hinge 52 are sized so as to provide a friction fit between the two components. The friction fit produces a uniform resistance to rotation of the second hinge 56.

Figure 9:
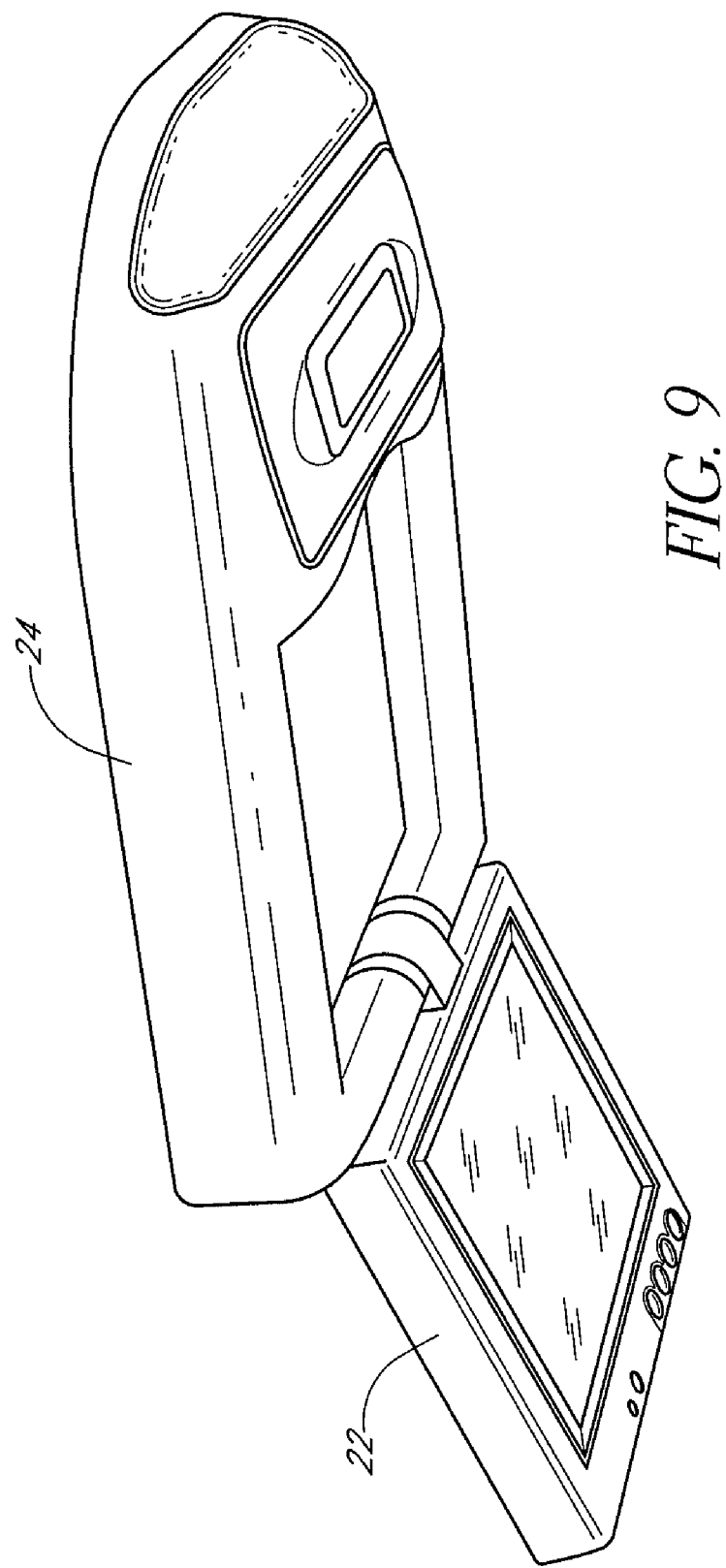
FIG. 9 is a perspective view of the vehicle roof mount illustrating the display in its fully extended position, 180° from its storage position.

The intersecting first and second axes 54, 58, and the self-tensioning character of the hinges 52, 56, provide the invention with two very important features. First, they enable the display 22 to be positioned at a wide variety of viewing angles. The display 22 may be rotated 180° about the first axis 54, from its storage position within the housing 24 to a point where it lies flat against the roof 26 in front of the housing 24, as FIG. 9 illustrates. The leading portion 44 of the housing 24 is designed so as not to interfere with the 180° range of motion of the display 22. The display 22 may also be rotated at least 30°, and preferably 45°, both to the right and to the left about the second axis 58. Positive stops (FIGS. 6 and 6A) within the housing 24 prevent the display 22 from being rotated any further. This range of angles in two different directions, coupled with the ability of the self-tensioning hinges 52, 56 to hold the display 22 in any position, accommodates a wide range of seating positions within the vehicle.

The second important consequence of the two intersecting axes 54, 58 is passenger safety. Whether a passenger is simply adjusting his position within the vehicle, or flying through the air as a result of a severe collision, any contact he makes with the display 22 will simply push the display 22 harmlessly out of the way. Whether the contact is made from the front or the back of the display 22, the display 22 has the ability to swing toward the roof 26, or toward the housing 24, until it lies flat against the one or the other and poses no obstruction to passengers.

Even if the display 22 is twisted to the left or right when the impact happens, it will still be pushed flat against the roof 26 or housing 24. As the display 22 nears the roof 26 or housing 24, the force of the roof 26 or housing 24 upon one edge of the display 22 will cause the display 22 to rotate about the second axis 58 until it aligns with the roof 26 or housing 24. And if a passenger contacts the display 22 from the left or right side, the rotation of the display 22 about the second axis 58 will deflect the blow, resulting in little or no harm to the passenger.

The above presents a description of the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention.

What is claimed is:

1. An assembly mountable to an interior surface of a roof of a vehicle, the assembly comprising:
   a housing comprising a first hinge portion and a recessed surface, the recessed surface at least partially defining a storage space, the housing further comprising a dome light; and
   a video display having a first face defining a viewing screen, the video display comprising a second hinge portion, the first hinge portion and the second hinge portion cooperating to pivotably connect the housing and the video display, such that the video display is movable between a storage position and a viewing position, the video display further comprising controls located on the first face, wherein when the video display is in the viewing position the viewing screen faces the rear of the vehicle, and wherein illumination of the dome light facilitates manipulation of the controls when the video display is in the viewing position.

2. The assembly of claim 1, wherein the assembly further comprises a microswitch selectively blocking power to the video screen, wherein when the video display is in the storage position the video display is at least partially disposed within the storage space, and the microswitch is in an off position in which no power may be channeled to the video screen.

3. The assembly of claim 1, wherein the dome light is positioned on a lower surface of the housing when the assembly is mounted to the roof of the vehicle.

* * * * *